(12) United States Patent
Dalsgaard et al.

(10) Patent No.: US 8,996,077 B2
(45) Date of Patent: Mar. 31, 2015

(54) METHOD AND APPARATUS TO LIMIT PERIODIC UPLINK TRANSMISSIONS

(75) Inventors: Lars Dalsgaard, Oulu (FI); Benoist Sebire, Tokyo (JP)

(73) Assignee: Nokia Corporation, Espoo (FI)

( * ) Notice: Subject to any disclaimer, the term of this patent is extended or adjusted under 35 U.S.C. 154(b) by 476 days.

(21) Appl. No.: 13/054,374

(22) PCT Filed: Jul. 13, 2009

(86) PCT No.: PCT/IB2009/006223
§ 371 (c)(1),
(2), (4) Date: Sep. 16, 2011

(87) PCT Pub. No.: WO2010/092422
PCT Pub. Date: Aug. 19, 2010

(65) Prior Publication Data
US 2011/0319065 A1  Dec. 29, 2011

Related U.S. Application Data

(60) Provisional application No. 61/134,876, filed on Jul. 14, 2008.

(51) Int. Cl.
*H04M 1/00* (2006.01)
*H04W 72/00* (2009.01)
(Continued)

(52) U.S. Cl.
CPC ......... *H04W 56/0005* (2013.01); *H04L 1/0027* (2013.01); *H04W 56/0045* (2013.01)
USPC ............................ 455/574; 455/450; 370/338

(58) Field of Classification Search
USPC ......... 370/229–235, 241–243, 338, 412, 311, 370/328, 329, 252, 330, 350; 455/450–453, 455/574, 418
See application file for complete search history.

(56) References Cited

U.S. PATENT DOCUMENTS

2007/0091817 A1* 4/2007 Yoon et al. .................... 370/252
2007/0287476 A1* 12/2007 Jeong et al. ............... 455/456.6
(Continued)

FOREIGN PATENT DOCUMENTS

WO  WO 2008/021188 A2  2/2008

OTHER PUBLICATIONS

3GPP TS 36.321 V8.0.0, dated Dec. 2007.*
(Continued)

*Primary Examiner* — Daniel Lai
(74) *Attorney, Agent, or Firm* — Squire Patton Boggs (US) LLP

(57) ABSTRACT

In accordance with an exemplary embodiment of the invention, there is at least a method, apparatus which may include operations that result from operation of computer program code, and a plurality of coupled logic circuit elements constructed to carry out the associated functions for, in response to signaling received from a network access node, prematurely terminating operation of a timer running on a user equipment, the timer being used to control how long the user equipment is considered uplink time aligned, and performing operations defined to be executed upon the timer expiring. Further, in accordance with an exemplary embodiment of the invention there is signaling a user equipment to prematurely terminate operation of a timer running on the user equipment, the timer being used to control how long the user equipment is considered uplink time aligned, and reserving an uplink resource for the user equipment.

20 Claims, 7 Drawing Sheets

---

8A: IN RESPONSE TO SIGNALING RECEIVED FROM A NETWORK ACCESS NODE, PREMATURELY TERMINATING OPERATION OF A TIMER RUNNING ON A USER EQUIPMENT, THE TIMER BEING USED TO CONTROL HOW LONG THE USER EQUIPMENT IS CONSIDERED UPLINK TIME ALIGNED

↓

8B PERFORMING OPERATIONS DEFINED TO BE EXECUTED UPON THE TIMER EXPIRING

(51) Int. Cl.
*H04W 56/00* (2009.01)
*H04L 1/00* (2006.01)

(56) References Cited

U.S. PATENT DOCUMENTS

2008/0310396 A1* 12/2008 Park et al. .................... 370/350
2009/0279495 A1* 11/2009 Yoo .............................. 370/329

OTHER PUBLICATIONS

TSGR2#6(99)807, by Ericsson, dated Aug. 16, 1999.*
International Search Report dated Nov. 13, 2009 corresponding to International Patent Application No. PCT/IB2009/006223.
"UE Specific Sync Timer Signalling and Procedure," 3GPP TSG-RAN WG2 #60bis, R2-080153, Jan. 14-18, 2008. Retrieved from http://www.quintillion.co.jp/3GPP/TSG_RAN/TSG_RAN2008/TSG_RAN_WG2_RL2_1.html, 3 pages.
"Suspension of Uplink Transmission During Radio Link Problem," 3GPP TSG-RAN WG2 #61bis, R2-081864, Mar. 31-Apr. 4, 2008. Retrieved from http://www.quintillion.co.jp/3GPP/TSG_RAN/TSG_RAN2008/TSG_RAN_WG2_RL2_3.html, 2 pages.
"SRS Transmission Timing During DRX," TSG-RAN WG2 #61-bis, R2-081867, Mar. 31-Apr. 4, 2008, Retrieved from http://www.quintillion.co.jp/3GPP/TSG_RAN/TSG_RAN2008/TSG_RAN_WG2_RL2_3.html, 7 pages.

* cited by examiner

METHOD AND APPARATUS TO LIMIT PERIODIC UPLINK TRANSMISSIONS

RELATED APPLICATION

This application was originally filed as PCT Application No. PCT/IB2009/006223 on Jul. 13, 2009 and claims priority to U.S. Provisional Application No. 61/134,876 filed on Jul. 14, 2008, which is incorporated herein by reference in its entirety.

TECHNICAL FIELD

The exemplary and non-limiting embodiments of this invention relate generally to wireless communication systems, methods, devices and computer programs and, more specifically, relate to techniques to accomplish signaling between a user equipment and a network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

3GPP third generation partnership project
UTRAN universal terrestrial radio access network
EUTRAN evolved UTRAN (LTE)
LTE long term evolution
Node B base station
eNB EUTRAN Node B (evolved Node B)
UE user equipment
UL uplink (UE towards eNB)
DL downlink (eNB towards UE)
EPC evolved packet core
MME mobility management entity
S-GW serving gateway
MM mobility management
HO handover
PDU protocol data unit
PHY physical
RLC radio link control
RRC radio resource control
RRM radio resource management
MAC medium access control
PDCP packet data convergence protocol
O&M operations and maintenance
CQI channel quality indicator
SC-FDMA single carrier, frequency division multiple access
PUCCH physical uplink control channel
SRS sounding reference signal
DRX discontinuous reception
TAT time alignment timer
TA time alignment/timing advance
SCH shared channel
RACH random access channel
LCD logical channel identifier The specification of a communication system known as evolved UTRAN (E-UTRAN, also referred to as UTRAN-LTE or as E-UTRA) has been addressed within 3GPP. In this system the DL access technique will be OFDMA and the UL access technique will be SC-FDMA.

One specification of interest to these and other issues related to the invention is 3GPP TS 36.300, V8.4.0 (2008-03), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and measurement and measurement reporting configuration for mobility and scheduling.

The E-UTRAN RRC-CONNECTED mode defines both DRX and periodic transmission of the CQI report. Additionally, it is understood that the periodic reporting of CQI and the transmission of SRS is masked with the DRX pattern such that the periodic CQI report and SRS are only sent during DRX on-duration, or alternatively during an active time. In addition, the transmission of periodic CQI and SRS are only performed so long as the UE has PUCCH resources allocated.

If the UE is in a cell in which PUCCH resources are not invalidated due to, for example, an uplink timing alignment timeout, a situation may arise that results in excessive UE power consumption, or less than optimum efficiency.

Another specification of interest is 3GPP TS 36.321 V8.2.0 (2008-05), Technical Specification 3rd Generation Partnership Project; Technical Specification Group Radio Access Network; Evolved Universal Terrestrial Radio Access (E-UTRA) Medium Access Control (MAC) protocol specification (Release 8).

In the E-UTRAN stage 3 MAC specifications reflected in 3GPP TS 36.321 it is stated in section 5.2 that the UE has a configurable time alignment timer (TAT). The TAT is valid only in the cell for which it was configured and started. It is further stated that when the TAT expires the UE is to release all PUCCH resources and release any assigned SRS resources.

A parameter range that has been under discussion related to the validity time for the TAT is between 500 ms and infinite (i.e., the TAT never expires).

Additionally, the UE can be configured to send periodic CQI reports and SRS in the UL. According to 3GPP TS 36.300 both of these parameters will be sent according to Stage 2 DRX rules. That is, when DRX is configured periodic CQI reports can only be sent by the UE during the "active-time". RRC can further restrict periodic CQI reports so that they are only sent during the on-duration. This means that if the UE is configured with periodic CQI and/or SRS the UE shall transmit these in the UL as long as the TAT is valid.

For small cells (macro or home cells) it may not be necessary to change the TA within the cell. This implies that the value of the TA is static and does not vary due to UE movement within the cell and, as a result, the TAT can be set to infinite.

SUMMARY

Various aspects of the exemplary embodiments of the invention are set out in the claims.

According to a first aspect of the invention, there is an apparatus comprising at least one processor and at least one memory including computer program code, the at least one memory and the computer program code are configured, with the at least one processor, to cause the apparatus, in response to received signaling, to at least prematurely terminate operation of a running timer, the timer being used to control how long the apparatus is considered uplink time aligned, and perform operations defined to be executed upon the timer expiring.

According to a second aspect of the invention, there is a method comprising in response to signaling received from a network access node, prematurely terminating operation of a timer running on a user equipment, the timer being used to control how long the user equipment is considered uplink time aligned, and performing operations defined to be executed upon the timer expiring.

According to a third aspect of the invention, there is an apparatus comprising at least one processor and at least one memory including computer program code, the at least one memory and the computer program code are configured, with the at least one processor, to cause the apparatus to transmit a signal to a user equipment, where the signal comprises an indication to prematurely terminate operation of a timer running on the user equipment, the timer being used to control how long the user equipment is considered uplink time aligned, and reserving an uplink resource for the user equipment.

According to a fourth aspect of the invention, there is a method comprising signaling a user equipment to prematurely terminate operation of a timer running on the user equipment, the timer being used to control how long the user equipment is considered uplink time aligned, and reserving an uplink resource for the user equipment.

BRIEF DESCRIPTION OF THE DRAWINGS

For a more complete understanding of the exemplary embodiments of the invention, reference is now made to the following descriptions taken in connection with the accompanying drawings in which.

DETAILED DESCRIPTION OF THE DRAWINGS

An example embodiment of an exemplary embodiment of the invention and its potential advantages are understood by referring to FIGS. 1 through 8 of the drawings.

Figure 1:
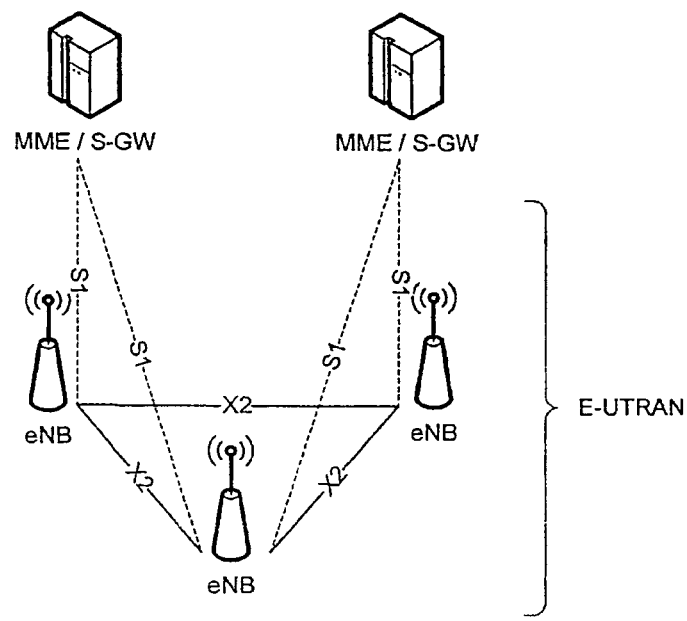
FIG. 1 reproduces FIG. 4 of 3GPP TS 36.300, and shows the overall architecture of the E-UTRAN system.
Figure 4:
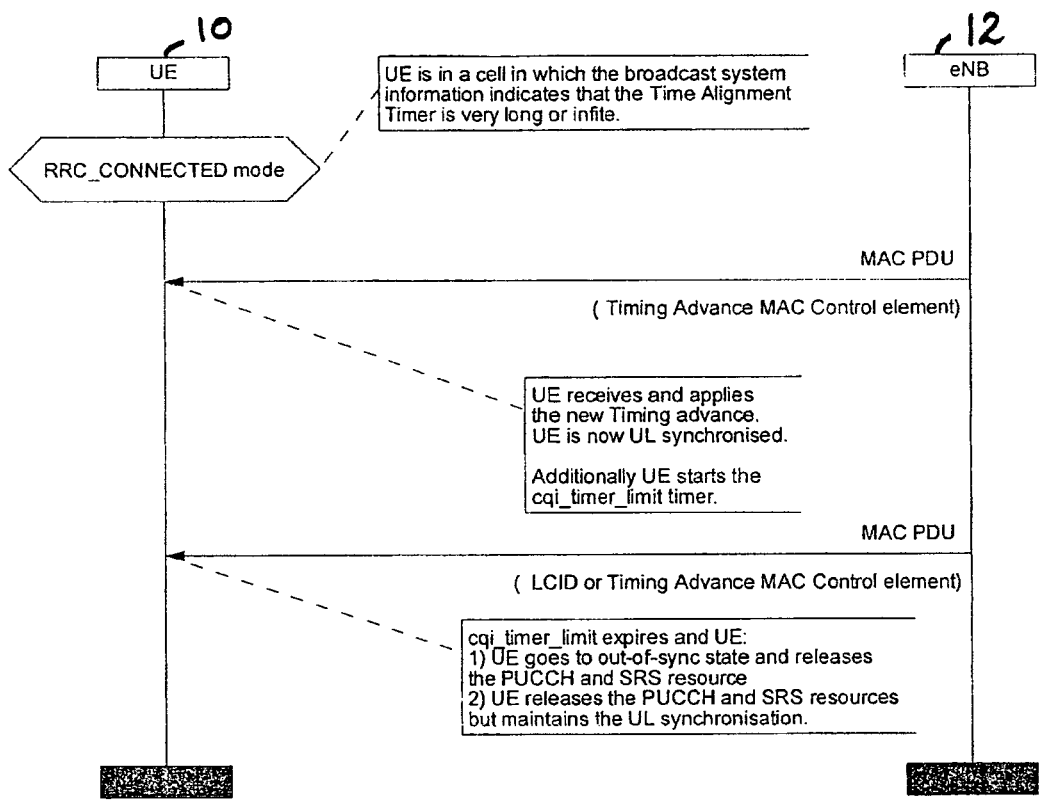
FIG. 4 is a second message flow diagram between the UE and eNB in accordance with second exemplary embodiments of this invention.

FIG. 1 reproduces FIG. 4 of 3GPP TS 36.300, and shows the overall architecture of the E-UTRAN system. The E-UTRAN system illustrated in FIG. 1 includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface.

Figure 2:
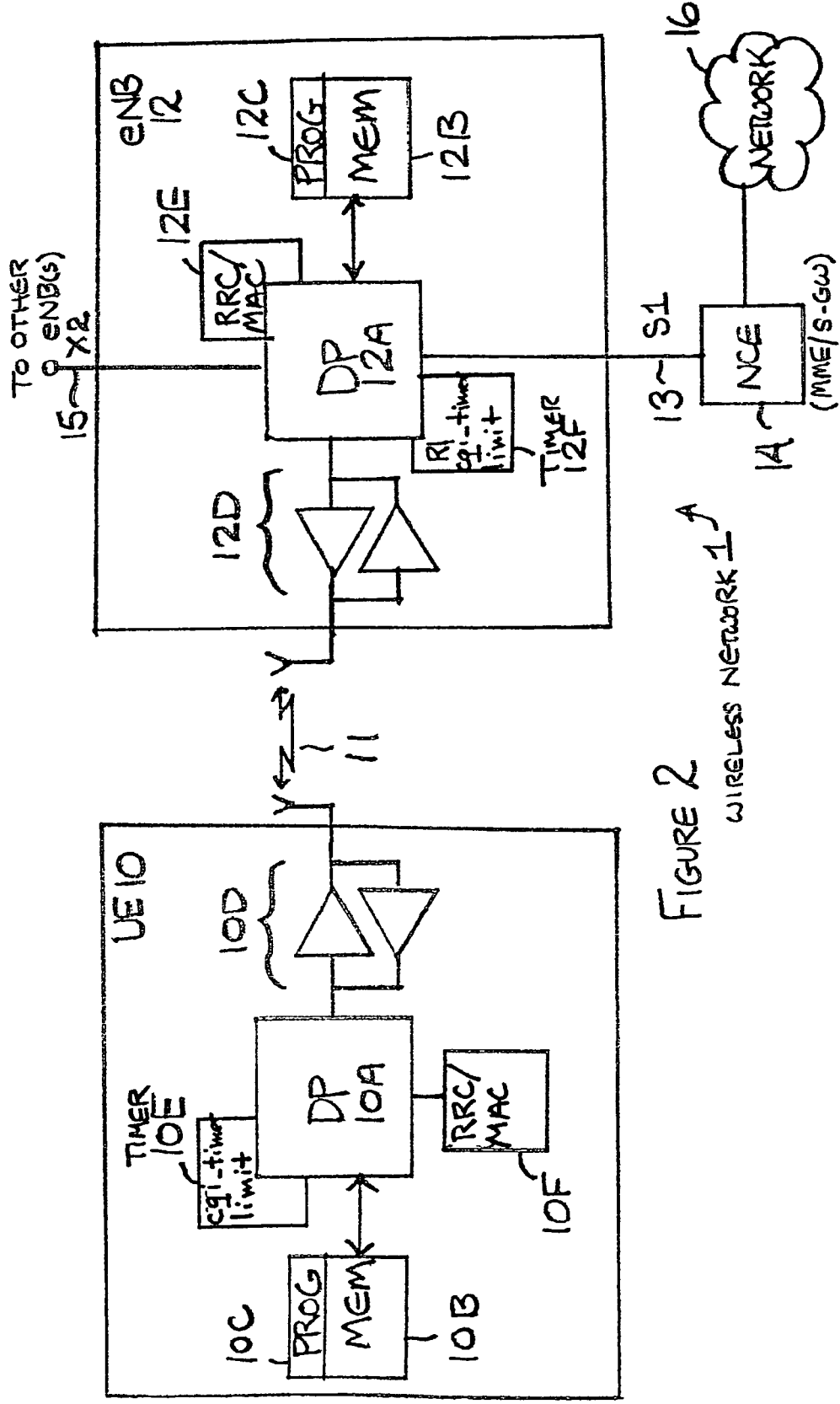
FIG. 2 shows a simplified block diagram of various electronic devices that are suitable for use in practicing the exemplary embodiments of this invention.

FIG. 2 illustrates a simplified block diagram of various electronic devices that are suitable for use in practicing the exemplary embodiments of this invention. In FIG. 2 a wireless network 1 is adapted for communication with an apparatus, such as a mobile communication device which may be referred to as a UE 10, via a network access node, such as a Node B (base station), and more specifically an eNB 12.

Figure 3:
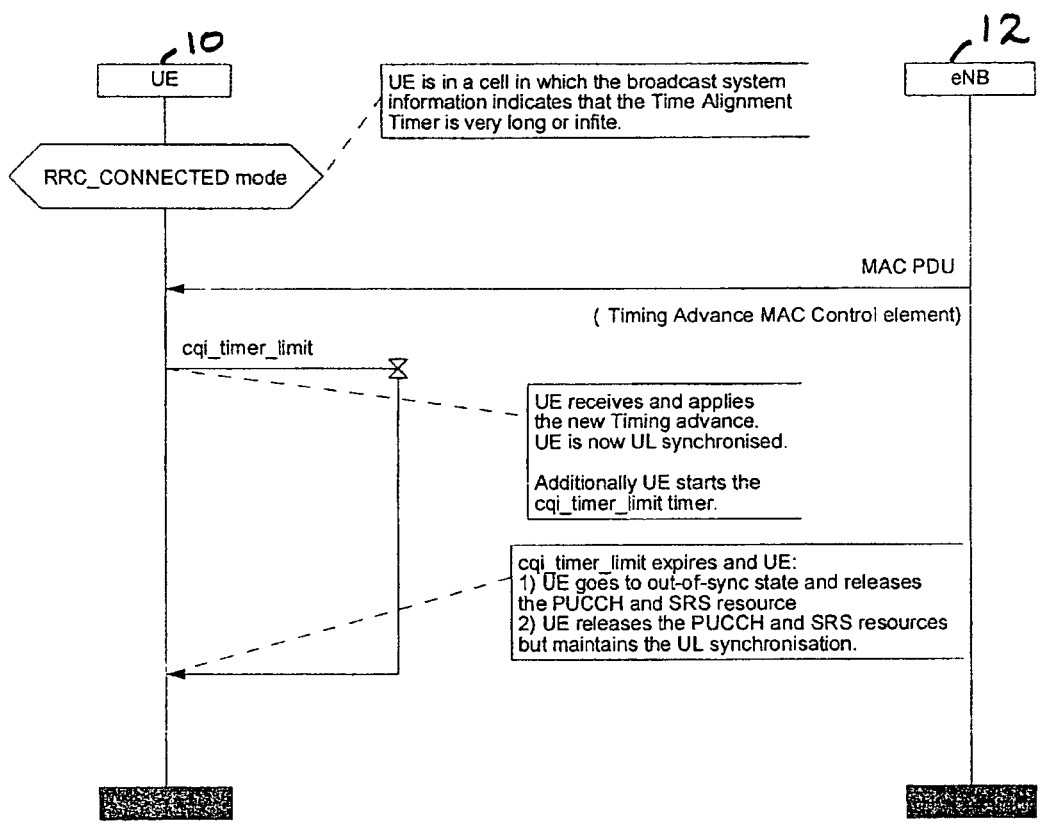
FIG. 3 is a first message flow diagram between the UE and eNB shown in FIG. 2 in accordance with first exemplary embodiments of this invention.

FIG. 3 illustrates several alternative approaches of the signaling related to the use of a cqi_timer_limit timer in accordance with the exemplary embodiments of the invention. In accordance with one exemplary embodiment an eNB 12 may indicate directly to a UE 10 when to apply periodic reporting and when to terminate periodic reporting. This can be accomplished by, as non-limiting examples, PDCCH signaling, MAC control header element signaling or other MAC-related signaling, or by RRC signaling. FIG. 4 illustrates another alternative approach in accordance with the exemplary embodiments of the invention. As illustrated in FIG. 4, when a UE 10 is receiving in a downlink MAC PDU a subheader having an LCD set to the predetermined go-out-of-sync, the UE 10 considers its current TAT as expired and releases all PUCCH resources, and any assigned SRS resources. As a result, periodic reporting on the PUCCH stops.

Figure 5:
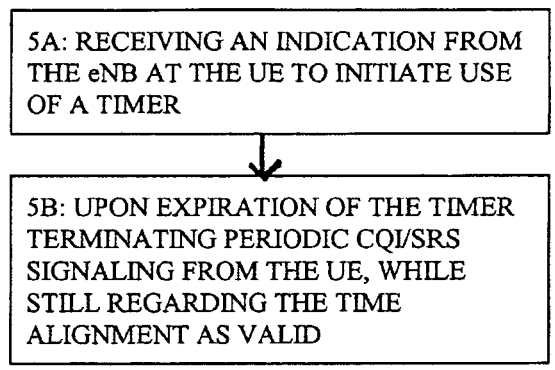
FIGS. 5, 6, 7, 8, and 9 are each a logic flow diagram that illustrates the operation of a method, and a result of execution of computer program instructions, in accordance with the exemplary embodiments of this invention.

FIG. 5 illustrates a block diagram of a method in accordance with an exemplary embodiment of the invention. In accordance with the method shown in FIG. 5, at Block 5A, an indication is received from the eNB at the UE to initiate use of a timer and, at block 5B, upon expiration of the timer terminating periodic CQI/SRS signaling from the UE while maintaining or still regarding the TA valid.

Figure 6:
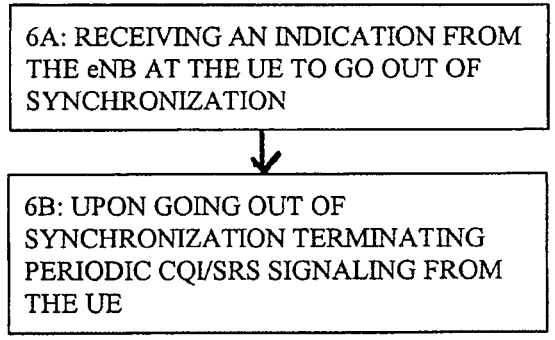

FIG. 6 illustrates a block diagram of another method in accordance with an exemplary embodiment of the invention. In accordance with the method shown in FIG. 6, at Block 6A, an indication is received from the eNB at the UE to go out of synchronization and, at block 6B, upon going out of synchronization terminating periodic CQI/SRS signaling from the UE.

Figure 7:
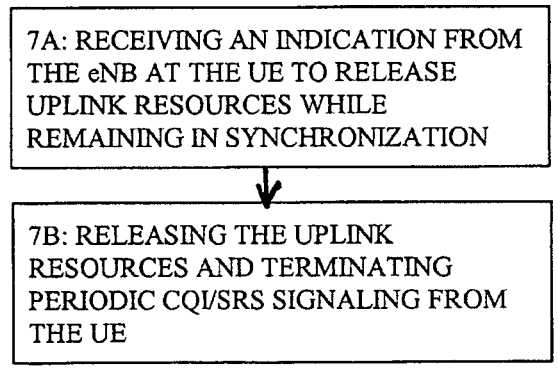

FIG. 7 illustrates a block diagram of another method in accordance with an exemplary embodiment of the invention. In accordance with the method shown in FIG. 7, at Block 7A, an indication is received from the eNB at the UE to release uplink resources while remaining in synchronization and, at block 7B, there is a releasing of the uplink resources and thereby terminating periodic CQI/SRS signaling from the UE.

Figure 8:
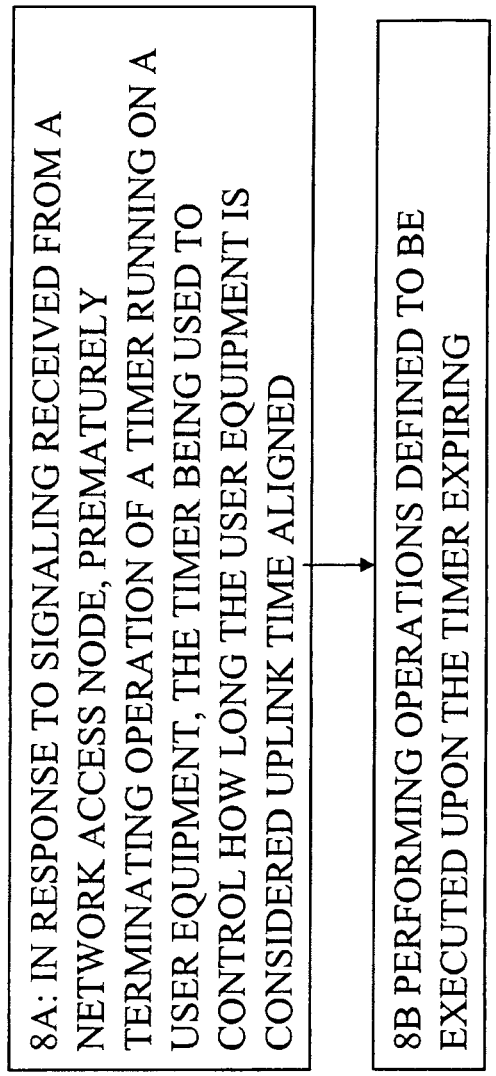

FIG. 8 illustrates a block diagram of still another method in accordance with an exemplary embodiment of the invention. In accordance with the method shown in FIG. 8, at Block 8A in response to signaling received from a network access node, prematurely terminating operation of a timer running on a user equipment, the timer being used to control how long the user equipment is considered uplink time aligned, and at Block 8B, performing operations defined to be executed upon the timer expiring.

Figure 9:
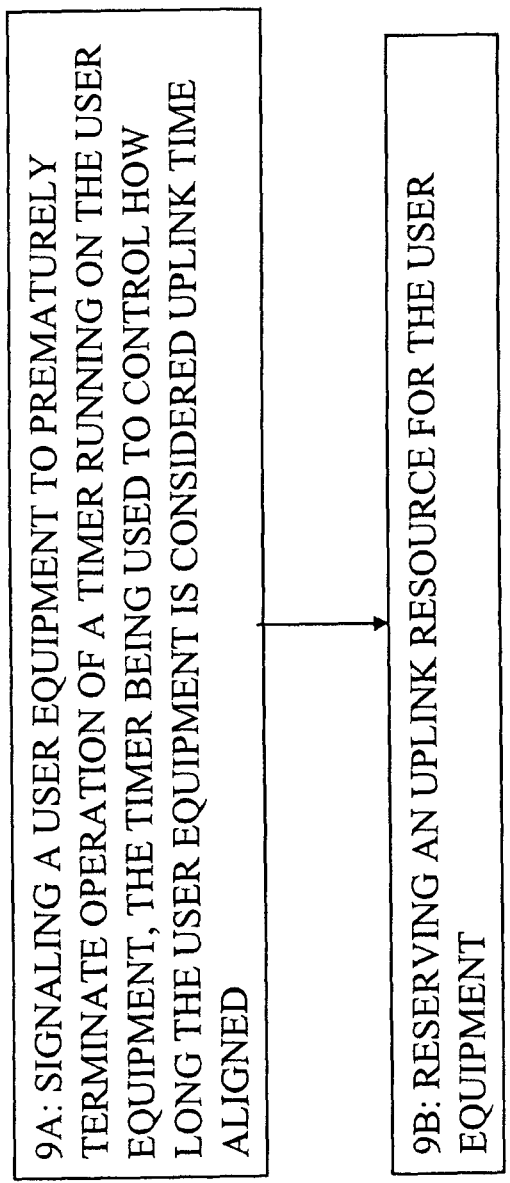

FIG. 9 illustrates a block diagram of yet another method in accordance with an exemplary embodiment of the invention. In accordance with the method shown in FIG. 9, at Block 9A signaling a user equipment to prematurely terminate operation of a timer running on the user equipment, the timer being used to control how long the user equipment is considered uplink time aligned, and at Block 9B reserving an uplink resource for the user equipment.

The various blocks shown in FIGS. 5, 6, 7, 8, and 9 may be viewed as method steps, and/or as operations that result from operation of computer program code, and/or as a plurality of coupled logic circuit elements constructed to carry out the associated function(s).

DETAILED DESCRIPTION

The inventors have realized that, in view of the understanding in E-UTRAN that the UE will transmit periodic CQI/SRS for as long as the UE is in the RRC-CONNECTED mode in a cell and has valid time alignment timer, there can be a major detrimental impact on the UE power consumption. This will be the case unless the reporting is limited in time, or the eNB/network either reconfigures the PUCCH resources to decrease the amount of UL signaling (which does not fully stop the reporting and increases the DL overhead), or orders the UE to the RRC Idle mode. This latter possibility also has drawbacks such as the Idle-connected setup time, and the additional signaling traffic due to Active-Idle-Active state transitions (plus other related and necessary signaling and actions). The UE mobility is autonomous when in the Idle mode.

The inventors provide at least two basic embodiments of solutions to these and other problems. The two solutions (embodiments) may be used independently or in a combination.

The first solution introduces a timer, referred to herein for convenience and not as a limitation as a cqi_timer_limit. This timer may be used in a case, for example, where the TAT is set to infinite (or very long). The cqi_timer_limit timer limits the time the UE transmits periodic CQI/SRS in the UL in cells in which the TAT is long/infinite. At the expiration of the cqi_timer_limit timer the UE terminates UL transmission of periodic CQI/SRS. The cqi_timer_limit timer is restarted or reset each time the UE has been actively receiving or transmitting on the SCH (i.e., UL activity on the PUCCH does not restart the cqi_timer_limit timer). Use of the cqi_timer_limit timer may be either configurable by the network or it may be fixed by specification.

The second solution introduces a MAC command to order the UE to go immediately out of synchronization (out-of-sync). Alternative, use of the MAC command or control element (CE) may be such that the UE does not go out-of-sync (i.e., invalidates the TAT), but instead maintains (UL) synchronization (i.e., continues to regard the TAT as valid) while releasing the allocated UL resources. In this way the UE releases the allocated PUCCH and SRS resources, and stops transmitting on these resources in the UL, while maintaining the UL synchronization (i.e., the TAT is still valid). One benefit of this approach is that periodic transmission in the UL is stopped while the TAT remains valid, which means that the setup time at DL data arrival (at the eNB) will be fast (as a RACH procedure is not needed).

Before describing these exemplary embodiments in further detail, reference is made to FIG. 2 for illustrating a simplified block diagram of various electronic devices that are suitable for use in practicing the exemplary embodiments of this invention. In FIG. 2 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 1, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas. The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 1. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software embodied on a memory and executable by the DP 10A of the UE 10 and by the DP 12A of the eNB 12, or by hardware, or by a combination of software and hardware. For the purposes of describing the exemplary embodiments of this invention the UE 10 may be assumed for at least one embodiment to also include a cqi_timer_limit timer 10E, which may be implemented in hardware or software, or as a combination of hardware and software. The UE 10 also includes RRC and MAC functions or units, shown collectively as the block 10F The eNB 12 also includes RRC and MAC functions or units, shown collectively as the block 12E.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Discussed now in further detail are the exemplary embodiments of this invention. The first solution referred to above may be implemented both with express signaling and also without express signaling. If signaling is used then it may be accomplished by the use of one parameter in RRC signaling.

The parameter may indicate that the UE 10 is to shall apply the cqi_timer_limit timer 10E in the cell (where the TAT is set to infinite or to some large value). A simple bit indication (use/not use) is sufficient if the actual length (maximum duration) of the cqi_timer_limit timer 10E is predefined, e.g., in a specification. An alternative approach is to indicate (signal) the actual length of the cqi_timer_limit timer 10E and, from the presence of the indication of the timer length in the signaling, the UE 10 knows to apply the cqi_timer_limit timer 10E with the specified length. The signaling of the length of the cqi_timer_limit timer 10E may be accomplished by, for example, using dedicated RRC signaling or by using broadcast information (e.g., system information (SI)). An advantage of the signaling approach is that it requires only a small amount of additional signaling bandwidth in addition to the already agreed upon signaling. The continuous start and stop of periodic reporting may be done without explicit signaling when the feature is first configured and parameters defined and exchanged.

Various alternative embodiments of the signaling related to the use of the cqi_timer_limit timer 10E may be used. For example, the eNB 12 may indicate directly to the UE 10 when to apply periodic reporting and when to terminate periodic reporting. This can be accomplished by, as non-limiting examples, PDCCH signaling, MAC control header element signaling or other MAC-related signaling, or by RRC signaling. This particular approach, and that of several alternatives, is illustrated in FIG. 3. Note that when the cqi_timer_limit timer 10E expires the UE 10 may enter the out-of-sync state and release the PUCCH and SRS resource, or it may release these resources while maintaining UL synchronization (as was discussed above).

As an alternative embodiment, one that does not require express signaling, the behavior of the UE 10 is defined when the TAT is infinite (or very long), and the length of the cqi_timer_limit timer 10E may then be established in a specification.

A further approach indicates the use/non-use (e.g., with 1 bit) of the cqi_timer_limit timer 10E. Another approach defines a default behavior (no express signaling to indicate use/not use), with the actual length of the cqi_timer_limit timer 10E being given by the network 1 via broadcast system information.

The meaning of time with respect to the above description may be expressed and understood in several ways. For example, time may be expressed as real time (seconds, etc). Alternatively, it may be expressed as a number of, for example, periodic CQI reports sent and/or an amount of SRS sent, in relation to System Frame Number (SFN), absolute or relative.

The cqi_timer_limit timer 10E may be reset or started/restarted at each occurrence of data transmission (data or signaling) in either the UL or the DL. As the TAT may be infinite (or very long) the TAT is not the primary trigger for releasing PUCCH resources allocated to the UE 10 for periodic CQI transmission. Instead, the cqi_timer_limit timer 10E is the primary resource and, thus, is preferably reset/restarted at each occurrence of a new UL/DL transmission.

There may be the cqi_timer_limit timer 10E in the UE 10, and another (synchronized) cqi_timer_limit timer 12F in the eNB 12. The length of these timers 10E, 12F is preferably such that the timer 12F running in the eNB 12 (and used for reserving the used PUCCH resources for to the UE) is longer than the timer used in the UE 10. This ensures that the PUCCH resources are reserved a bit longer than necessary in case of errors. Additionally the eNB 12 reserves the necessary PUCCH resource for the UE prior to addressing the UE 10.

The reason being that the resources in the UL used by the UE 10 for transmitting the CQI/SRS need to be allocated for the UE, i.e., reserved by eNB 12 for this purpose. The UE 10 cannot use the PUCCH resources reserved for periodic reporting if the cqi_timer_limit has expired, or if the UE 10 has not successfully decoded a PDCCH after the expiration of the cqi_timer_limit timer 10E (for re-initiating the data transfer and periodic reporting).

In another exemplary embodiment the periodic CQI/SRS transmission timer limit is not limited for use when the TAT value is infinite or very large, but is simply applied in general by the eNB 12 when needed.

With regard now to the second solution referred to above, the occurrence of an LCID reserved for the "go out-of-synch" command is sufficient for the UE 10 to identify the command. In other words, unlike conventional MAC control elements for which an identification (MAC subheader) and a content is required, the "go out-of-synch" command may include just a MAC subheader with the LCID set to a predetermined value for ordering the UE 10 to go out-of-synch.

When receiving in a downlink MAC PDU a subheader having an LCID set to the predetermined go out-of-sync, the UE 10 considers its current TAT as expired and releases all PUCCH resources, and any assigned SRS resources. As a result, periodic reporting on the PUCCH stops. This embodiment and alternatives are illustrated in FIG. 4. Note that FIG. 4 also shows the use of the cqi_timer_limit timer 10E.

Note that in a similar way as explained for when the cqi_timer_limit timer 10E expires, the UE 10 may enter the out-of-sync state and release the PUCCH and SRS resource, or it may release these resources while maintaining UL synchronization, when receiving the MAC PDU subheader (as was discussed above).

Use of one of the exemplary embodiments listed above does not restrict the use of the other exemplary embodiment. Both exemplary embodiments can be applied simultaneously. For example, the eNB 12 may have defined a cqi_timer_limit timer, but may choose instead to use MAC signaling as discussed above in order to stop or limit the periodic CQI/SRS transmission prior to expiry of the cqi_timer_limit timer.

A number of advantages can be realized by the use of the exemplary embodiments. For example, the UE 10 can avoid a situation where it is required to transmit CQI/SRS continuously while in RRC-CONNECTED mode, thereby conserving power.

In addition, the eNB 12 can control the UL resources reserved for the UE 10 for sending periodic CQI/SRS without being forced to move the UE 10 to Idle mode, thereby conserving signaling bandwidth.

In addition, UE 10 power saving is possible in cells where the TAT is infinite (without being forced to transfer the UE in and out of the RRC-CONNECTED mode, thereby also conserving the signaling bandwidth.

Further, the use of these exemplary embodiments enables a possibility to maintain the UE 10 in the RRC-CONNECTED mode, despite having a TAT that is set to infinite, without excessive consumption of power.

It is pointed out that when the TA is no longer valid (for which there already exists a defined timer) the UE 10 shall release the PUCCH resources and thereby terminate transmission of periodic CQI reports. The exemplary embodiments of this invention provide in one aspect thereof another timer (referred to herein for convenience as the cqi_timer_limit timer) that is used to terminate the periodic reporting on the PUCCH while still maintaining the TA as valid.

For a maintenance of uplink time alignment the UE may have a configurable time alignment timer (e.g., TAT and/or timeAlignmentimer) which is used to control how long the UE is considered uplink time aligned. The time alignment timer may only be valid in the cell for which it was configured and started.

In section 5.2 of 3GPP TS 36.321 V8.2.0 it is originally described that for Maintenance of Uplink Time Alignment the UE 10 may:

when a Timing Advance Command MAC control element is received:
    apply the Timing Advance Command;
    start or restart the time alignment timer.
when a Timing Advance Command is received in a Random Access Response message:
    if the Random Access Preamble was not selected by UE MAC:
        apply the Timing Advance Command;
        start or restart time alignment timer.
    else, if the time alignment timer is not running:
        apply the Timing Advance Command;
        start the time alignment timer;
        when the contention resolution is considered not successful stop the time alignment timer.
    else:
        ignore the received Timing Advance Command.
when the time alignment timer expires:
    flush all HARQ buffers;
    notify RRC to release PUCCH/SRS;
    clear any configured downlink assignments and uplink grants.

It can be seen that flushing all HARQ buffers, notifying RRC to release PUCCH/SRS, and clearing any downlink assignments and downlink grants, result from the expiration of the time alignment timer. In accordance with the exemplary embodiments of this invention, the same applications that occur at the expiration of the time alignment timer can also be caused by receipt of the signaling that forces the early termination of the time alignment timer. That is the operations can be caused by using the RRC and/or MAC control header element signaling in accordance with the exemplary embodiments of the invention.

Based on the foregoing it should be apparent that the exemplary embodiments of this invention provide a method, apparatus and computer program(s) to enhance the operation of the UE 10 with the eNB in the RRC-CONNECTED mode so as to limit the amount of periodic CQI/SRS signaling performed by the UE 10.

A) Referring to FIG. 5, in a first embodiment of this invention a method includes, at Block 5A, receiving an indication from the eNB 12 at the UE 10 to initiate use of a timer and, at Block 5B, upon expiration of the timer terminating periodic CQI/SRS signaling from the UE 10 while maintaining or still regarding the TA valid.

B) The method of the preceding paragraph performed when in the RRC-CONNECTED state.

C) The method of the preceding paragraphs, where the indication comprises a single bit.

D) The method of paragraph B, where the indication comprises a timer value.

Referring to FIG. 6, in a further embodiment of this invention a method includes, at Block 6A, receiving an indication from the eNB 12 at the UE 10 to go out of synchronization and, at Block 6B, upon going out of synchronization terminating periodic CQI/SRS signaling from the UE 10. The method of the preceding paragraph performed when in the RRC-CONNECTED state.

Referring to FIG. 7, in a further embodiment of this invention a method includes, at Block 7A, receiving an indication from the eNB 12 at the UE 10 to release uplink resources while remaining in synchronization and, at Block 7B, releasing the uplink resources and thereby terminating periodic CQI/SRS signaling from the UE 10.

The method of the preceding paragraph performed when in the RRC-CONNECTED state.

The method of the preceding paragraphs, where the indication is received as a LCD that comprises part of a MAC subheader.

Referring to FIG. 8, in an embodiment of the invention a method includes at Block 8A in response to signaling received from a network access node, prematurely terminating operation of a timer running on a user equipment, the timer being used to control how long the user equipment is considered uplink time aligned, and at Block 8B, performing operations defined to be executed upon the timer expiring.

The method of the preceding paragraph, where the user equipment is in a radio resource control connected state and where the signaling comprises radio resource control signaling.

The method of the preceding paragraphs, where the signaling orders the user equipment to go out of uplink time alignment, and where upon going out of the uplink time alignment the user equipment performs at least one of terminating a periodic uplink transmission and releasing an allocated uplink resource.

The method of the preceding paragraphs, comprising receiving further signaling from the network access node that comprises at least one of an indication to use a channel quality indicator timer and an indication of a duration of a channel quality indicator timer to be used by the user equipment.

The method of the preceding paragraph, where the timer is a time alignment timer, and where the channel quality indicator timer limits a time that the user equipment can transmit a periodic uplink signaling when the time alignment timer is running on the user equipment.

The method of the preceding paragraphs, where upon an expiration of the channel quality indicator timer the user equipment enters an out of uplink time aligned state and performs at least one of terminating a periodic uplink transmission and releasing an allocated uplink resource.

The method of the preceding paragraphs, where upon an expiration of the channel quality indicator timer the user equipment performs at least one of terminating a periodic uplink transmission and releasing an allocated uplink resource while maintaining an uplink time aligned state.

Referring to FIG. 9, in another embodiment of the invention a method includes at Block 9A signaling a user equipment to prematurely terminate operation of a timer running on the user equipment, the timer being used to control how long the user equipment is considered uplink time aligned, and at Block 9B reserving an uplink resource for the user equipment.

The method of the preceding paragraph, further comprising signaling an indication to use a channel quality indicator timer and an indication of a duration of the channel quality indicator timer.

The method of the preceding paragraphs, where the timer is a time alignment timer, and where the channel quality indicator timer limits a time that the user equipment can transmit periodic uplink signaling.

The various blocks shown in FIGS. 5, 6, 7, 8, and 9 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design can be fabricated as one or more integrated circuit devices.

It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. For example, while the exemplary embodiments have been described above in the context of the E-UTRAN (UTRAN LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples. Further, the various names used for the described parameters (e.g., TAT, cqi_timer_limit, etc.) are not intended to be limiting in any respect, as these parameters may be identified by any suitable names. Further, the formulas and expressions that use these various parameters may differ from those expressly disclosed herein. Further, the various names assigned to different channels (e.g., PUCCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   in response to signaling received from a network access node to prematurely terminate operation of a timer running on a user equipment, prematurely terminating operation of the timer running on the user equipment, wherein the network access node and the user equipment are in radio-resource-connected mode, the timer is used to control how long the user equipment is considered uplink time aligned, the premature termination of the operation of the timer is configured to conserve power of the user equipment by stopping periodic reporting performed by the user equipment; and
   performing operations defined to be executed upon the timer expiring.

2. The method according to claim 1, where the user equipment is in a radio resource control connected state and where the signaling comprises radio resource control signaling.

3. The method according to claim 1, where the signaling orders the user equipment to go out of uplink time alignment, and where upon going out of the uplink time alignment the user equipment performs at least one of terminating a periodic uplink transmission and releasing an allocated uplink resource.

4. The method according to claim 1, comprising receiving further signaling from the network access node that comprises at least one of an indication to use a channel quality indicator timer and an indication of a duration of a channel quality indicator timer to be used by the user equipment.

5. The method according to claim 4, where the timer is a time alignment timer, and where the channel quality indicator timer limits a time that the user equipment can transmit a periodic uplink signaling when the time alignment timer is running on the user equipment.

6. The method according to claim 4, where upon an expiration of the channel quality indicator timer the user equipment enters an out of uplink time aligned state and performs at least one of terminating a periodic uplink transmission and releasing an allocated uplink resource.

7. The method according to claim 4, where upon an expiration of the channel quality indicator timer the user equipment performs at least one of terminating a periodic uplink transmission and releasing an allocated uplink resource while maintaining an uplink time aligned state.

8. A non-transitory computer readable medium encoded with a computer program executable by a processor to perform the method of claim 1.

9. An apparatus comprising:
   at least one processor and at least one non-transitory memory including computer program code;
   the at least one memory and the computer program code are configured, with the at least one processor, to cause the apparatus, in response to received signaling that is received from a network access node to prematurely terminate operation of a timer running on the apparatus, to at least:

prematurely terminate operation of the running timer, wherein the timer is used to control how long the apparatus is considered uplink time aligned, the premature termination of the operation of the timer is configured to conserve power of the apparatus by stopping periodic reporting performed by the apparatus, and the network access node and the apparatus are in radio-resource-connected mode; and perform operations defined to be executed upon the timer expiring.

10. The apparatus according to claim 9, where the apparatus is in a radio resource control connected state and where the signaling comprises radio resource control signaling.

11. The apparatus according to claim 9 where in response to further received signaling, the at least one memory and the computer program code are configured with the at least one processor to cause the apparatus to go out of uplink time alignment and, upon going out of the uplink time alignment, to at least one of terminate a periodic uplink transmission and release an allocated uplink resource.

12. The apparatus according to claim 9, further comprising receiving further signaling from the network access node that comprises at least one of an indication to use a channel quality indicator timer and an indication of a duration of a channel quality indicator timer.

13. The apparatus according to claim 12, where the timer is a time alignment timer, and where the channel quality indicator timer is configured to limit a time that periodic uplink signaling can be transmitted when the time alignment timer is running.

14. The apparatus according to claim 13, where upon an expiration of the channel quality indicator timer the at least one memory and the computer program are configured, with the at least one processor, to cause the apparatus to enter an out of uplink time aligned state and to at least one of terminate periodic uplink transmission and release an allocated uplink resource.

15. The apparatus according to claim 13, where upon an expiration of the channel quality indicator timer the at least one memory and the computer program are configured, with the at least one processor, to cause the apparatus to at least one of terminate periodic uplink transmission and release an allocated uplink resource while maintaining an uplink time aligned state.

16. A method comprising:

signaling a user equipment to prematurely terminate operation of a timer running on the user equipment, wherein the user equipment is in radio-resource-connected mode with a network access node, the timer is used to control how long the user equipment is considered uplink time aligned, the premature termination of the operation of the timer is configured to conserve power of the user equipment by stopping periodic reporting performed by the user equipment; and reserving an uplink resource for the user equipment.

17. The method according to claim 16, further comprising signaling an indication to use a channel quality indicator timer and an indication of a duration of the channel quality indicator timer.

18. The method according to claim 17, where the timer is a time alignment timer, and where the channel quality indicator timer limits a time that the user equipment can transmit periodic uplink signaling.

19. An apparatus comprising:

at least one processor and at least one non-transitory memory including computer program code;

the at least one memory and the computer program code are configured, with the at least one processor, to cause the apparatus to:

transmit a signal to a user equipment, wherein the user equipment is in radio-resource-connected mode with a network access node, the signal comprises an indication to prematurely terminate operation of a timer running on the user equipment, wherein the timer is used to control how long the user equipment is considered uplink time aligned, the premature termination of the operation of the timer is configured to conserve power of the user equipment by stopping periodic reporting performed by the user equipment; and reserve an uplink resource for the user equipment.

20. The apparatus according to claim 19, where the at least one memory and the computer program code are further configured, with the at least one processor, to cause the apparatus to transmit a further signal to the user equipment, where the further signal comprises at least one of an indication to use a channel quality indicator timer and an indication of a duration of a channel quality indicator timer.

* * * * *